(12) United States Patent
Sakai et al.

(10) Patent No.: US 7,902,276 B2
(45) Date of Patent: Mar. 8, 2011

(54) SURFACE SIZING AGENT AND USE THEREOF

(75) Inventors: Kazunari Sakai, Kakogawa (JP); Yoko Hayashi, Kakogawa (JP)

(73) Assignee: Harima Chemicals, Inc., Hyogo (JP)

( * ) Notice: Subject to any disclaimer, the term of this patent is extended or adjusted under 35 U.S.C. 154(b) by 54 days.

(21) Appl. No.: 12/439,445

(22) PCT Filed: Aug. 31, 2006

(86) PCT No.: PCT/JP2006/317214
§ 371 (c)(1),
(2), (4) Date: Feb. 27, 2009

(87) PCT Pub. No.: WO2008/026282
PCT Pub. Date: Mar. 6, 2008

(65) Prior Publication Data
US 2010/0016480 A1    Jan. 21, 2010

(51) Int. Cl.
*C08L 3/02*   (2006.01)
*C08L 3/00*   (2006.01)

(52) U.S. Cl. ............................................. 524/48; 524/47

(58) Field of Classification Search ...... 524/48
See application file for complete search history.

(56) References Cited

U.S. PATENT DOCUMENTS

| | | | |
|---|---|---|---|
| 4,835,212 A | 5/1989 | Degen et al. | |
| 4,855,343 A * | 8/1989 | Degen et al. | 524/47 |
| 5,358,998 A | 10/1994 | Wendel et al. | |
| 6,114,417 A * | 9/2000 | O'Toole et al. | 524/27 |
| 6,310,132 B1 | 10/2001 | Sackmann et al. | |
| 6,426,381 B1 | 7/2002 | Konig et al. | |

FOREIGN PATENT DOCUMENTS

| | | |
|---|---|---|
| JP | 63-50596 A | 3/1988 |
| JP | 63-203895 A | 8/1988 |
| JP | 5-209024 A | 8/1993 |
| JP | 11-240906 A | 9/1999 |
| JP | 2002-504563 A | 2/2002 |
| JP | 2002-527643 A | 8/2002 |

OTHER PUBLICATIONS

International Search Report of PCT/JP2006/317214 dated Dec. 12, 2006.
Chinese Office Action Dated Jun. 10, 2010.

* cited by examiner

*Primary Examiner* — Ling-Siu Choi
*Assistant Examiner* — Hui Chin
(74) *Attorney, Agent, or Firm* — Sughrue Mion, PLLC

(57) ABSTRACT

A surface sizing agent is provided which has excellent dispersion stability, enables impartation of high sizing performance under a wide range of use conditions, irrespective of the characteristics of water used for sizing (hardness, pH, etc.) and the type of paper, and has low foaming property and good coating workability. Specifically, in a dispersion-type surface sizing agent obtained by emulsion polymerization of a monomer composition in the presence of a degraded dextrin, 20-40 parts by weight of a degraded dextrin having a weight average molecular weight of 26000-50000, obtained by enzyme denaturation of a waxy corn starch, are allowed to exist to 100 parts by weight of the total amount of the monomer composition, and the monomer composition includes (a) 10-35% by weight of at least one type of (meth)acrylic acid alkyl ester, (b) 40-80% by weight of other copolymerizable hydrophobic monomer, and (c) 1-10% by weight of a strong acid group-containing monomer.

5 Claims, No Drawings

SURFACE SIZING AGENT AND USE THEREOF

TECHNICAL FIELD

The present invention relates to a surface sizing agent intended for paper products such as paper and paperboard, and to the use of the surface sizing agent. More particularly, the invention relates to a surface sizing agent that has excellent dispersion stability, and enables impartation of high sizing performance under a wide range of use conditions, irrespective of the characteristics of water used for sizing (hardness, pH and the like) and the type of paper, and has low foaming property and good coating workability. The invention also relates to paper products sized by using the surface sizing agent.

BACKGROUND ART

In general, the surface sizing agent can be roughly classified into solution type and dispersion type. It can be said that the solution type is relatively susceptible to applied environment, particularly water (pH, hardness and the like). On the other hand, the dispersion type has the following drawbacks that when an anionic emulsifier is used as a dispersant, precipitation occurs by calcium ions and the like in water. This may induce deterioration of the performance as the surface sizing agent, and also cause the problems of machine contamination and bubbling. Therefore, it has conventionally been known to use a graft polymer using polysaccharide as a stabilizer, dispersibility might be insufficient depending on the type and the amount of a monomer used. In this case, dispersion stability can be improved by using jointly, for example, a surfactant having high ionic strength, whereas it becomes difficult to fix onto the surfaces of paper products. This may induce deterioration of sizing performance as the purpose of the surface sizing agent, and also increase bubbling. On the other hand, when a graft polymer of polysaccharide having low ionicity is used as a stabilizer, excellent hard water stability can be attained, whereas the interaction and fixing action with various types of ions existing in the paper become weak, thus making it difficult to attain high sizing performance.

Specifically, the following surface sizing agents have been heretofore reported.

That is, Patent Document 1 has proposed a sizing agent composed of a fine aqueous dispersion of a copolymer which is obtained by emulsion polymerization of 10 to 56 parts by weight of a monomer mixture consisting of 20 to 65% by weight of acrylonitrile, 80 to 35% by weight of acrylic ester of C3-C8 alcohol, and 0 to 10% by weight of other ethylene-unsaturated monomer in 100 parts by weight of an aqueous solution containing 15 to 25% by weight of a degraded starch having a specific viscosity, in the presence of a peroxide group-containing initiator. However, this sizing agent has insufficient dispersion stability and requires improvement.

Patent Document 2 has proposed a sizing agent which is obtained by emulsion polymerization of 40 to 140 parts of a monomer mixture consisting of 20 to 65% of acrylonitrile, 80 to 35% of acrylic ester of monovalent saturated C3-C8 alcohol and 0 to 10% of other ethylene-unsaturated copolymerizable monomer in 100 parts of an aqueous solution containing 2.7 to 15 parts of a degraded starch having a specific viscosity. However, this sizing agent also has poor dispersion stability and requires improvement.

Patent Document 3 has proposed a dispersion liquid of a copolymer containing a starch degradation product having a weight average molecular weight of 2500 to 25000, which is manufactured by radical polymerization of an unsaturated monomer, followed by hydrolysis in water phase. However, this dispersion liquid has the drawback that the molecular weight of the starch degradation product used as a stabilizer is relatively low, and a large amount of hydrophilic portions are liable to generate by the hydrolysis, thereby being capable of inducing deterioration of sizing effect.

Patent Document 4 has proposed, as a surface sizing agent, an aqueous emulsion polymer obtained by addition polymerization of a monomer in the presence of a starch degraded product and a polymer emulsifier such as sulfo-containing maleic anhydride copolymers or sulfo-containing oligourethanes having a branched molecular structure of terpolymers. However, this surface sizing agent uses jointly the polymer emulsifier, causing concern about foaming property compared with the case of using the starch degraded product alone.

Patent Document 5 has proposed a dispersion liquid of an aqueous polymer composed basically of a copolymer of styrene and (meth)acrylic ester, as a polymer dispersion liquid for paper sizing. However, this polymer dispersion liquid has a high content of the (meth)acrylic ester in the polymer, failing to impart sufficient sizing effect to the paper requiring strong water repellency.

Patent Document 6 has proposed a sizing agent whose water repellency imparting effect is improved by increasing the content of styrene and decreasing the content of (meth) acrylic ester in the polymer. However, this sizing agent contains neither ethylene-based unsaturated carboxylic acid nor sulfonic acid in the entire solid composition of a polymer and a dispersant. It is therefore difficult to say that sufficient effect can be expected in both sizing performance and dispersion stability.

Thus, all these related art surface sizing agents have certain problems, and hence a surface sizing agent is desired which is capable of exhibiting sufficiently satisfactory performance under any environment, irrespective of water characteristics (hardness, pH and the like) and the type of paper.

Patent Document 1: Japanese Unexamined Patent Publication No. 63-50596
Patent Document 2: Japanese Unexamined Patent Publication No. 63-203895
Patent Document 3: Japanese Unexamined Patent Publication No. 5-209024
Patent Document 4: Japanese Unexamined Patent Publication No. 11-240906
Patent Document 5: Japanese Unexamined Patent Publication No. 2002-504563
Patent Document 6: Japanese Unexamined Patent Publication No. 2002-527643

DISCLOSURE OF THE INVENTION

Problems to be Solved by the Invention

Advantage of the present invention is to provide a surface sizing agent that has excellent dispersion stability, and enables impartation of high sizing performance under a wide range of use conditions, irrespective of the characteristics of water used (hardness, pH and the like) and the type of paper, and has low foaming property and good coating workability, and also provide paper products sized by using the surface sizing agent.

Means for Solving the Problems

The present inventors have made research effort for solving the above problems and have completed the present invention based on the following finding. That is, by using, as a dispersant, a specific amount of a degraded dextrin having a specific molecular weight, which is obtained by enzyme denaturation of a specific starch (specifically a waxy corn starch), an emulsion dispersion having high dispersion stability can be obtained. When this is coated onto paper products by using hard water, it is unaffected by the characteristics of water and paper, and easily distributed onto the surfaces of the paper products, enabling high sizing performance to be achieved efficiently. Further, when the specific monomer type containing a strong acid group-containing monomer is used in a specific composition, as a monomer composition used for emulsion polymerization in the presence of the degraded dextrin, ionicity can be imparted to emulsion polymerization dispersed particles, and this is coupled with the dispersion action of the degraded dextrin, thereby obtaining a stable emulsion dispersion. As a result, even when this is coated onto paper products, it can be fixed and oriented on the surfaces of the paper products, thereby achieving high sizing performance.

The surface sizing agent of the invention is a dispersion type obtained by emulsion polymerization of a monomer composition in the presence of a degraded dextrin. As the degraded dextrin, 20 to 40 parts by weight of a degraded dextrin having a weight average molecular weight of 26000 to 50000, which is obtained by enzyme denaturation of a waxy corn starch, are allowed to exist to 100 parts by weight of the total amount of the monomer composition. The monomer composition includes (a) 10 to 35% by weight of at least one type of (meth)acrylic acid alkyl ester, (b) 40 to 80% by weight of other copolymerizable hydrophobic monomer, and (c) 1 to 10% by weight of a strong acid group-containing monomer. In the invention, the term "(meth)acrylic acid alkyl ester" means acrylic acid alkyl ester or methacrylic acid alkyl ester.

The paper products according to the invention are sized by using the above-mentioned surface sizing agent of the invention. Preferably, the paper products according to the invention are inkjet printing papers.

EFFECT OF THE INVENTION

Thus, the invention is capable of imparting high sizing performance with excellent coating stability under a wide range of use conditions, irrespective of the characteristics of water (hardness, pH and the like) and the type of paper.

PREFERRED EMBODIMENT FOR CARRYING OUT THE INVENTION

The surface sizing agent according to the invention is a dispersion type obtained by emulsion polymerization of a monomer composition in the presence of a degraded dextrin.

The degraded dextrin is obtained by enzyme denaturation of a waxy corn starch. The effect of the invention can be achieved by using the degraded dextrin whose base starch is a waxy corn starch among various starches. Although the reason for this is uncertain, it can be estimated that a peculiarly high content of amylopectin in the waxy corn starch compared with other starches may act thereon.

The degraded dextrin usable in the invention can be obtained by performing water-based enzyme denaturation with the waxy corn starch as a base starch. Commercially available examples of the degraded dextrin usable in the invention include "Amycol No. 7-H" manufactured by NIPPON STARCH CHEMICAL CO., LTD.

The weight average molecular weight of the degraded dextrin is 26000 to 50000, preferably 30000 to 40000. This facilitates distribution onto the surfaces of paper products when coated onto the paper products, enabling high sizing performance to be achieved efficiently. Further, an emulsion dispersion product having good dispersion stability can be obtained without using any emulsifier in the emulsion polymerization. When the weight average molecular weight of the degraded dextrin is below 26000, the sizing performance of the obtained surface sizing agent is deteriorated. On the other hand, when it exceeds 50000, the dispersion stability of the obtained surface sizing agent is poor, resulting in a practically undurable product.

In the invention, the weight average molecular weight of the degraded dextrin is measured by gel permeation chromatography. Specifically, it can be measured under the conditions described in the following examples.

It is important that the amount of the degraded dextrin allowed to exist during the emulsion polymerization is 20 to 40 parts by weight to 100 parts by weight of the total amount of a monomer composition. When the amount of the degraded dextrin is less than 20 parts by weight to 100 parts by weight of the total amount of a monomer composition, the dispersion stability of the obtained emulsion polymerization product is liable to deteriorate. On the other hand, when it exceeds 40 parts by weight, sizing performance, particularly inkjet suitability is liable to deteriorate.

The above-mentioned monomer composition includes (a) 10 to 35% by weight of at least one type of (meth)acrylic acid alkyl ester, (b) 40 to 80% by weight of other copolymerizable hydrophobic monomer, and (c) 1 to 10% by weight of a strong acid group-containing monomer. Thus, the compatibility between excellent sizing performance and inkjet suitability can be achieved by containing the above (a) (meth)acrylic acid alkyl ester and the above (b) other copolymerizable hydrophobic monomer at a specific ratio. Further, by containing the specific amount of the above (c) strong acid group-containing monomer that is necessary minimum, the emulsion dispersion stability can be improved. Additionally, it is capable of imparting ionity by copolymerization of the strong acid group-containing monomer suitable for emulsion polymerization dispersed particles, instead of a dispersant. Therefore, when coated onto paper products, it is easy to fix and orient on the surfaces of the paper products, thereby achieving high sizing performance.

When the above (a) (meth)acrylic acid alkyl ester is less than 10% by weight, the dispersion stability of the emulsion polymerization product is remarkably deteriorated. On the other hand, when it exceeds 35% by weight, both sizing performance and inkjet suitability are deteriorated.

When the above (b) other copolymerizable hydrophobic monomer is less than 40% by weight, both sizing performance and inkjet suitability are deteriorated. On the other hand, when it exceeds 80% by weight, the dispersion stability of the emulsion polymerization product is remarkably deteriorated and filterability is deteriorated.

When the above (c) strong acid group-containing monomer is less than 1% by weight, the filterability of the emulsion polymerization product is deteriorated. On the other hand, when it exceeds 10% by weight, it becomes difficult to fix and orient on the surfaces of paper products, failing to achieve high sizing performance.

As an alkyl group in the above (a) (meth)acrylic acid alkyl ester, straight-chain or branched alkyl groups having a carbon number of 1 to 10 are preferred. Specific examples of the (a) (meth)acrylic acid alkyl ester include methyl(meth)acrylate (methyl(meth)acrylate is abbreviated as "MMA"), ethyl (meth)acrylate, propyl(meth)acrylate, n-butyl(meth)acrylate, isobutyl(meth)acrylate, t-butyl(meth)acrylate, cycrohexyl(meth)acrylate, benzyl(meth)acrylate and 2-ethylhexyl (meth)acrylate. Only one type or two or more types of these (meth)acrylic acid alkyl esters may be used. When two or more types are used, the total weight should be within the above-mentioned range.

Examples of the above (b) other copolymerizable hydrophobic monomer include styrene, α-methylstyrene, vinyl toluene, chloromethyl styrene and (meth)acrylironitrile. Only one type or two or more types of these other copolymerizable hydrophobic monomers may be used. When two or more types are used, the total weight should be within the above-mentioned range.

Examples of the above (c) strong acid group-containing monomer includes acrylic acid, methacrylic acid, maleic anhydride, fumaric acid, itaconic acid, styrene sulfonic acid, sulfopropyl(meth)acrylate and 2-(meth)acrylamide-2-methylpropane sulfonic acid. Only one type or two or more types of these strong acid group-containing monomers may be used. When two or more types are used, the total weight should be within the above-mentioned range.

Preferably, the monomer composition is usually composed of the above (a), the above (b) and the above (c). Alternatively, other monomer may be contained unless it impairs the effect of the invention.

In the invention, except that the specific amount of the degraded dextrin is allowed to exist as described above, no particular limit is imposed on the emulsion polymerization method, and the usual method for emulsion polymerization may be employed suitably. For example, the degraded dextrin is introduced as an aqueous solution into a reaction container, and metal ions are added thereinto. After the oxygen within the reaction container is expelled sufficiently by using nitrogen gas, the monomer composition and hydrogen peroxide are individually added to perform polymerization, while increasing temperature to maintain the temperature. Upon termination of the addition of the monomer composition, an organic peroxide is added and then matured until the remaining monomer is sufficiently reduced, thereby obtaining the surface sizing agent of the invention.

As a radical copolymerization initiator for emulsion polymerization, an azo compound and hydrogen peroxide can be used. Preferably, metal ions are also allowed to exist within the reaction system. Thereby, the improved effect as a redox catalyst can be expected. Examples of the metal ions include copper ions and iron ions. For example, they may be added as a copper salt solution, an iron salt solution or the like. Although no particular limit is imposed on the amount of addition of the metal ions, it is suitable to add 1 to 5% by weight of an oxidizing agent typically represented by hydrogen peroxide.

Although no particular limit is imposed on the organic peroxide used for emulsion polymerization, for example, benzoyl peroxide may be used. Although no particular limit is imposed on the amount of addition of the organic peroxide, it is preferably 0.1 to 2% by weight to the total amount of the monomer composition.

The reaction temperature during the emulsion polymerization is preferably 75° C. to 95° C., more preferably 80° C. to 90° C., without being limited thereto.

The reaction time for the emulsion polymerization may be set suitably according to the reaction temperature or the like, and no particular limit is imposed thereon. For example, the monomer composition is added for 2 to 4 hours, and between the point immediately after completion of the addition of the monomer composition and the point after 60 minutes (preferably about 30 minutes) are elapsed thereafter, the organic peroxide is added and then matured for about 1 to 2 hours so as to sufficiently reduce the amount of remaining monomer.

Preferably, during the emulsion polymerization, the oxygen within the reaction container is sufficiently replaced with an inert gas such as nitrogen gas.

The paper products of the invention are sized by using the surface sizing agent of the invention as described above. Specific examples of the paper products include papers and paperboards such as normal papers, fine papers and base papers for liner. No particular limit is imposed on the sizing method when these paper products are sized by using the above-mentioned surface sizing agent of the invention, and any related art method may be employed suitably.

The paper products of the invention are those to which high sizing performance is imparted, and also have inkjet suitability (refer to the following examples). Therefore, the paper products of the invention are preferably inkjet printing papers.

EXAMPLES

The invention will be described more specifically based on the following examples, without being limited thereto.

The molecular weight of the degraded dextrin is measured by a gel permeation chromatography under the following conditions.

Columns: "AsahipakGS-710," "AsahipakGS-520HQ" and "AsahipakGS-2B" (each manufactured by Showa Denko K.K.)

Flow rate: 1.0 mL/min, 0.6 mL/min

Injection amount: 20 μL

Example 1

Into a 1 L four-mouth flask provided with a thermometer, a stirrer, a reflux cooling pipe and a nitrogen introducing pipe, 73 parts by weight of a degraded dextrin obtained by enzyme denaturation of a waxy corn starch ("Amycol No. 7-H" manufactured by NIPPON STARCH CHEMICAL CO., LTD.), 490 parts by weight of water and 28 parts by weight of 1% by weight iron sulfate solution were poured. While mixing and stirring them under a nitrogen air flow, the oxygen within the reaction container was sufficiently expelled, and then the temperature was raised to 85° C. While maintaining the temperature constant, 242 parts by weight of a mixture of a hydrophobic monomer and a strong acid group-containing monomer (170 parts by weight of styrene, 25 parts by weight of isobutyl methacrylate, 35 parts by weight of butyl acrylate and 12 parts by weight of methacrylic acid) and 185 parts by weight of a hydrogen peroxide solution were individually added and polymerized for three hours. After 30 minutes were elapsed from the completion of addition of the monomer mixture, 1 part by weight of organic peroxide (benzoyl peroxide) was added and matured for one hour. Thereafter, this was cooled to room temperature and adjusted to pH 6.9 by using 48% potassium hydroxide solution, thereby obtaining a dispersion-type surface sizing agent having a solid concentration of 31.0% by weight.

The obtained surface sizing agent was filtered through a 200-mesh metal net filter, and the filtering residue on the metal net filter was visually observed, and the filterability thereof was evaluated according to the following criteria. The results showed that the surface sizing agent obtained in Example 1 was evaluated as a "○" in filterability.

Symbol "○" indicates excellent filterability and little or no filtering residue;

Symbol "x" indicates poor filterability and much filtering residue.

Examples 2 to 10 and Comparative Examples 1 to 11

Dispersion-type surface sizing agents were obtained in the same manner as in Example 1, except that the type of a degraded dextrin (a base starch and a denaturation method) and the amount thereof, and the types of a hydrophobic monomer and a strong acid group-containing monomer and their respective amounts were changed as shown in Table 1. The filterability of each of these obtained surface sizing agents was evaluated in the same manner as in Example 1. The results are shown in Table 1.

The degraded dextrins used in these examples and comparative examples are as follows.

Example 2: "Trial product 1 (base starch: waxy corn)" manufactured by NIPPON STARCH CHEMICAL CO., LTD.;

Example 3: "Trial product 2 (base starch: waxy corn)" manufactured by NIPPON STARCH CHEMICAL CO., LTD.;

Examples 4 to 10 and Comparative Examples 8 to 11: "Amycol No. 7-H" manufactured by NIPPON STARCH CHEMICAL CO., LTD.;

Comparative Example 1: "Trial product 3 (base starch: waxy corn)" manufactured by NIPPON STARCH CHEMICAL CO., LTD.;

Comparative Example 2: "Trial product 4 (base starch: waxy corn)" manufactured by NIPPON STARCH CHEMICAL CO., LTD.;

Comparative Example 3: "Amycol No. 6-L" manufactured by NIPPON STARCH CHEMICAL CO., LTD.;

Comparative Example 4: "Trial product 5 (base starch: tapioca)" manufactured by NIPPON STARCH CHEMICAL CO., LTD.;

Comparative Example 5: "Amycol No. 1" manufactured by NIPPON STARCH CHEMICAL CO., LTD.;

Comparative Example 6: "Dextrin 4-C" manufactured by NIPPON STARCH CHEMICAL CO., LTD.; and Comparative Example 7: "Dextrin 102-S" manufactured by NIPPON STARCH CHEMICAL CO., LTD.

Comparative Examples 12 and 13

Comparative Example 12 employed a commercially available solution-type surface sizing agent (ammonia saponification product of styrene-acrylic acid polymer). Comparative Example 13 employed a commercially available dispersion-type surface sizing agent (an emulsion polymerization product obtained by emulsion polymerization of a styrene-acryl ester monomer in a styrene-acrylic acid polymer salt solution). The filterability of each of these surface sizing agents was evaluated in the same manner as in Example 1. The results are shown in Table 1.

TABLE 1

| | | Degraded dextrin | | | To 100 parts by weight of total amount of monomer composition (parts by weight) | (meth)acrylic acid alkyl ester (a) | |
|---|---|---|---|---|---|---|---|
| | | Base starch | Denaturation method | Weight average molecular weight | | Types | Parts by weight |
| Example | 1 | Waxy corn | Enzyme | 30000 | 30 | iBMA | 10 |
| | 2 | Waxy corn | Enzyme | 44000 | 30 | iBMA | 5 |
| | 3 | Waxy corn | Enzyme | 27000 | 30 | iBMA | 10 |
| | 4 | Waxy corn | Enzyme | 30000 | 30 | iBMA | 10 |
| | 5 | Waxy corn | Enzyme | 30000 | 30 | MMA | 10 |
| | 6 | Waxy corn | Enzyme | 30000 | 25 | MMA | 12 |
| | 7 | Waxy corn | Enzyme | 30000 | 30 | 2EHMA | 10 |
| | 8 | Waxy corn | Enzyme | 30000 | 30 | iBMA | 15 |
| | 9 | Waxy corn | Enzyme | 30000 | 40 | iBMA | 10 |
| | 10 | Waxy corn | Enzyme | 30000 | 20 | iBMA | 10 |
| Comparative Example | 1 | Waxy corn | Enzyme | 100000 | 30 | iBMA | 10 |
| | 2 | Waxy corn | Enzyme | 14000 | 30 | iBMA | 10 |
| | 3 | Tapioca | Enzyme | 9000 | 30 | iBMA | 10 |
| | 4 | Tapioca | Enzyme | 32000 | 30 | iBMA | 10 |
| | 5 | Potato | Enzyme | 4500 | 30 | iBMA | 10 |
| | 6 | Tapioca | Roasting | 12000 | 30 | iBMA | 10 |
| | 7 | Potato | Roasting | 11000 | 30 | iBMA | 10 |
| | 8 | Waxy corn | Enzyme | 30000 | 30 | iBMA | 10 |
| | 9 | Waxy corn | Enzyme | 30000 | 30 | 2EHA | 5 |
| | 10 | Waxy corn | Enzyme | 30000 | 30 | MMA | 30 |
| | 11 | Waxy corn | Enzyme | 30000 | 30 | iBMA | 15 |
| | 12 | Ammonia saponification product of styrene-acrylic acid polymer | | | | | |
| | 13 | Emulsion polymerization product obtained by emulsion polymerization of styrene-acryl ester monomer in styrene-acrylic acid polymer salt solution | | | | | |

| | | (meth)acrylic acid alkyl ester (a) | | Other hydrophobic monomer (b) | | Strong acid group-containing monomer (c) | | Filterability |
|---|---|---|---|---|---|---|---|---|
| | | Types | Parts by weight | Types | Parts by weight | Types | Parts by weight | |
| Example | 1 | nBA | 15 | St | 70 | MAA | 5 | ○ |
| | 2 | 2EHA | 10 | St | 80 | MAA | 5 | ○ |
| | 3 | nBA | 25 | St | 64 | MAA | 1 | ○ |

TABLE 1-continued

|  |  |  | (a) | | (b) | | (c) | | |
| --- | --- | --- | --- | --- | --- | --- | --- | --- | --- |
|  |  |  | type | % | type | % | type | % | |
|  |  | 4 | 2EHA | 15 | St | 70 | MAA | 5 | ○ |
|  |  | 5 | 2EHA | 15 | St | 70 | MAA | 5 | ○ |
|  |  | 6 | nBA | 15 | St | 70 | MAA | 3 | ○ |
|  |  | 7 | nBA | 15 | St | 70 | MAA | 5 | ○ |
|  |  | 8 | nBA | 20 | St | 57 | MAA | 8 | ○ |
|  |  | 9 | nBA | 15 | St | 70 | MAA | 5 | ○ |
|  |  | 10 | nBA | 15 | St | 70 | MAA | 5 | ○ |
| Comparative | | 1 | nBA | 15 | St | 70 | MAA | 5 | x |
| Example | | 2 | nBA | 15 | St | 70 | MAA | 5 | ○ |
|  |  | 3 | nBA | 15 | St | 70 | MAA | 5 | ○ |
|  |  | 4 | nBA | 15 | St | 70 | MAA | 5 | ○ |
|  |  | 5 | nBA | 15 | St | 70 | MAA | 5 | ○ |
|  |  | 6 | nBA | 15 | St | 70 | MAA | 5 | ○ |
|  |  | 7 | nBA | 15 | St | 70 | MAA | 5 | ○ |
|  |  | 8 | nBA | 10 | St | 67 | MAA | 13 | ○ |
|  |  | 9 | — | — | St | 90 | MAA | 5 | x |
|  |  | 10 | nBA | 40 | St | 25 | MAA | 5 | ○ |
|  |  | 11 | nBA | 15 | St | 70 | MAA | 0 | x |
|  |  | 12 | Ammonia saponification product of styrene-acrylic acid polymer | | | | | | | ○ |
|  |  | 13 | Emulsion polymerization product obtained by emulsion polymerization of styrene-acryl ester monomer in styrene-acrylic acid polymer salt solution | | | | | | | ○ |

The following abbreviations are used in Table 1.
iBMA: isobutyl methacrylate
nBA: butyl acrylate
MMA: methyl methacrylate
2EHA: 2-ethylhexyl acrylate
2EHMA: 2-ethylhexyl methacrylate
St: styrene
MAA: methacrylic acid As can be seen from Table 1, when the weight average molecular weight of the degraded dextrin is too large (Comparative Example 1), and when the (meth)acrylic acid alkyl ester (a) is less than a predetermined amount (Comparative Example 9), and when the strong acid group-containing monomer (c) is not contained (Comparative Example 11), their respective emulsion dispersions had poor stability, resulting in poor filterability.

The following evaluations were made on the surface sizing agents obtained in the above Examples and Comparative Examples. The results are shown in Table 2. Comparative Example 1, Comparative Example 9 and Comparative Example 11 had poor filterability and hence the following evaluations were not made thereon.

<Evaluation 1>

In evaluation 1, the sizing effect of these surface sizing agents was evaluated by using the following three types of base papers.

Base paper A: a neutral fine paper containing no internal sizing agent, paper weight 65 g/m²;

Base paper B: a neutral normal paper containing an internal sizing agent, paper weight 70 g/m²; and Base paper C: a base paper for liner containing no internal sizing agent, paper weight 180 g/m²

(Preparation of Coating Solutions)

A coating solution was prepared by diluting an oxide starch ("MS3800" manufactured by Nihon shokuhin Kako Co., Ltd.) with distilled water so as to have a concentration of 10% by weight, followed by gelatinization at 95° C. so as to have such solid concentrations, namely, 5% by weight of the oxide starch, 0.05 to 0.5% by weight of a surface sizing agent (specifically, 0.05% by weight for the base paper A, 0.2% by weight for the base paper B and 0.05% by weight for the base paper C), and 1% by weight of sodium chloride (NaCl) (distilled water was used as diluent water).

Separately, a coating solution was prepared in the same manner as above, except that in order to confirm the influence of hardness, a synthetic hard water having a hardness of 500 ppm ($CaCO_3$) was used instead of the distilled water.

(Coated Paper Making and Evaluation Thereof)

(I) Coated Paper Making Using Base Paper A and Evaluation Thereof

Coated papers were made by coating each of these coating solutions thus obtained (using the distilled water and the synthetic hard water, respectively) onto the base paper A by a size press machine. The sizing performance was evaluated by measuring the stockigt sizing degree (sec) after moisture-stabilizing the obtained coated papers for 12 hours under constant-temperature and constant-moisture environment (22° C. and 50% in relative humidity).

(II) Coated Paper Making Using Base Paper B and Evaluation Thereof

Coated papers were made by coating each of these coating solutions thus obtained (using the distilled water and the synthetic hard water, respectively) onto the base paper B by a size press machine. The sizing performance was evaluated by measuring the stockigt sizing degree (sec) after moisture-stabilizing in the same manner as in the above (I). Inkjet suitability was evaluated through the following feathering test and strike-through test by using a Bubble Jet (registered trademark) printer ("BJ-F200" manufactured by Canon Inc.).

Feathering Test: A plurality of straight lines orthogonal to one another were printed, and the feathering of these straight lines were visually observed to judge by a five-stage standard. That is, the case having no feathering was judged as a "5", and the case where the featherings of the adjacent straight lines were completely crossed over was judged as a "1".

Strike-Through Test: Solid printing was carried out, and the feathering degree of the ink on the back of the solid printed area was visually observed to judge by a five-stage standard. That is, the case where no ink was feathered on the back was judged as a "5", and the completely strike-through case was judged as a "1".

(III) Coated Paper Making Using Base Paper C and Evaluation Thereof

Coated papers were made by coating each of these coating solutions thus obtained (using the distilled water and the synthetic hard water, respectively) onto the base paper C by a size press machine. After moisture stabilization was carried out in the same manner as in the above (I), the degree of water absorption (g/m$^2$) was measured by Cobb test for one minute.

<Evaluation 2>

In evaluation 2, the foaming property of these surface sizing agents was evaluated.

(Preparation of Coating Solutions)

A coating solution using distilled water and a coating solution using a synthetic hard water having a hardness of 500 ppm (in terms of CaCO$_3$) were prepared in the same manner as in the method as described in Evaluation 1 (the preparation of coating solutions), except for changes to solid concentrations, namely, 5% by weight of the oxide starch, 0.3% by weight of a surface sizing agent, and 1% by weight of sodium chloride (NaCl).

Each 400 mL of these coating solutions thus obtained (using the distilled water and the synthetic hard water, respectively) was maintained at 50° C. and then stirred for 30 seconds by using a domestic mixer, and the foam height was measured when three minutes were elapsed after stopping the stirring.

In Comparative Example 8, sizing performance and inkjet suitability comparable to those of each Example were achieved depending on the water hardness and the paper type. However, the sizing performance of the base paper A using the hard water, the inkjet suitability (strike-through) of the base paper B using the hard water, and the water absorbability to the base paper C were apparently inferior to those of each Example.

In Comparative Examples 12 and 13, the individual evaluation results when the hard water was used were apparently extremely inferior to those when the distilled water was used.

While the surface sizing agents and their purposes according to the invention have been described in detail, the scope of the invention is not restricted by the foregoing descriptions, and suitable changes or improvement may be made therein without departing from the gist of the invention.

The invention claimed is:

1. A dispersion-type surface sizing agent which is obtained by emulsion polymerization of a monomer composition in the presence of a degraded dextrin, wherein
    as the degraded dextrin, 20 to 40 parts by weight of a degraded dextrin having a weight average molecular weight of 26000 to 50000, which is obtained by enzyme denaturation of a waxy corn starch, are allowed to exist to 100 parts by weight of the total amount of the monomer composition, and
    the monomer composition includes (a) 10 to 35% by weight of at least one type of (meth)acrylic acid alkyl ester, (b) 40 to 80% by weight of other copolymerizable hydrophobic monomer, and (c) 1 to 10% by weight of a strong acid group-containing monomer.

2. Paper products sized by using the surface sizing agent according to claim 1.

TABLE 2

| | | Base paper A | | Base paper B | | | | | | Base paper C Degree of water absorption measured by Cobb test for one minute (g/m$^2$) | | Evaluation 2 Foam height of three minutes after stopping the stirring (mm) | |
| | | Stockigt sizing degree (sec) | | Stockigt sizing degree (sec) | | Inkjet suitability | | | | | | | |
| | | | | | | Feathering | | Strike-through | | | | | |
| | | Distilled water | Synthetic hard water | Distilled water | Synthetic hard water | Distilled water | Synthetic hard water | Distilled water | Synthetic hard water | Distilled water | Synthetic hard water | Distilled water | Synthetic hard water |
|---|---|---|---|---|---|---|---|---|---|---|---|---|---|
| Example | 1 | 5.7 | 5.4 | 20 | 20 | 5 | 5 | 5 | 5 | 21 | 25 | 15 | 15 |
| | 2 | 5.9 | 5.5 | 21 | 20 | 5 | 5 | 5 | 5 | 20 | 24 | 15 | 16 |
| | 3 | 4.4 | 4.0 | 19 | 19 | 5 | 5 | 5 | 5 | 22 | 24 | 14 | 14 |
| | 4 | 3.6 | 3.3 | 19 | 19 | 5 | 5 | 5 | 4 | 20 | 25 | 16 | 16 |
| | 5 | 3.8 | 3.5 | 18 | 18 | 4 | 4 | 4 | 4 | 23 | 27 | 18 | 20 |
| | 6 | 3.9 | 3.2 | 18 | 18 | 4 | 4 | 4 | 4 | 22 | 28 | 17 | 20 |
| | 7 | 4.9 | 4.7 | 20 | 19 | 5 | 5 | 5 | 4 | 20 | 24 | 15 | 16 |
| | 8 | 5.5 | 5.3 | 20 | 19 | 5 | 5 | 5 | 5 | 20 | 26 | 14 | 15 |
| | 9 | 4.5 | 4.4 | 19 | 18 | 4 | 4 | 4 | 4 | 21 | 29 | 14 | 14 |
| | 10 | 4.8 | 4.6 | 19 | 18 | 5 | 4 | 5 | 5 | 21 | 28 | 17 | 18 |
| Comparative Example | 1 | — | — | — | — | — | — | — | — | — | — | — | — |
| | 2 | 2.4 | 1.6 | 14 | 13 | 2 | 2 | 2 | 2 | 31 | 55 | 16 | 20 |
| | 3 | 1.8 | 1.3 | 15 | 14 | 2 | 2 | 2 | 2 | 33 | 56 | 20 | 25 |
| | 4 | 2.6 | 2.0 | 15 | 14 | 3 | 2 | 2 | 2 | 30 | 52 | 18 | 21 |
| | 5 | 1.6 | 1.2 | 14 | 14 | 2 | 2 | 3 | 2 | 35 | 62 | 23 | 25 |
| | 6 | 1.7 | 1.1 | 15 | 14 | 2 | 2 | 3 | 3 | 32 | 60 | 16 | 16 |
| | 7 | 2.6 | 1.8 | 17 | 15 | 3 | 2 | 3 | 2 | 30 | 51 | 15 | 17 |
| | 8 | 3.3 | 2.5 | 18 | 17 | 4 | 4 | 4 | 3 | 30 | 44 | 12 | 14 |
| | 9 | — | — | — | — | — | — | — | — | — | — | — | — |
| | 10 | 2.5 | 1.9 | 15 | 14 | 2 | 2 | 3 | 2 | 31 | 54 | 18 | 22 |
| | 11 | — | — | — | — | — | — | — | — | — | — | — | — |
| | 12 | 4.5 | 1.3 | 19 | 15 | 5 | 3 | 5 | 2 | 29 | 67 | 12 | 28 |
| | 13 | 4.1 | 2.1 | 18 | 16 | 5 | 3 | 5 | 3 | 25 | 50 | 7 | 17 |

As can be seen from Table 2, Examples 1 to 10 achieved high sizing performance irrespective of the water hardness and the paper type, and they had low foaming property and excellent inkjet suitability.

In contrast, Comparative Examples 2 to 7 and 10 had low sizing performance and poor inkjet suitability irrespective of whether the distilled water or the synthetic hard water was used, and whether the base paper A or B or C was used.

3. The paper products according to claim 2 intended for inkjet printing papers.

4. The surface sizing agent according to claim 1, wherein the other copolymerizable hydrophobic monomer is at least one selected from the group consisting of styrene, α-methylstyrene, vinyl toluene, and chloromethyl styrene.

5. The surface sizing agent according to claim 1, wherein the strong acid group-containing monomer is at least one selected from the group consisting of acrylic acid, methacrylic acid, maleic anhydride, fumaric acid, itaconic acid, styrene sulfonic acid, sulfopropyl(meth)acrylate, and 2-(meth)acrylamide-2-methylpropane sulfonic acid.

* * * * *